United States Patent
O'Connor et al.

(10) Patent No.: US 9,747,733 B2
(45) Date of Patent: Aug. 29, 2017

(54) DIGITAL RECORDING AND REPLAY SYSTEM FOR AN AIRCRAFT AND METHOD FOR REPRODUCTION OF ONBOARD INSTRUMENTATION OF AN AIRCRAFT

(71) Applicant: Pilatus Flugzeugwerke AG, Stans, OT (CH)

(72) Inventors: Daniel O'Connor, Ennetmoos (CH); Bruno Cervia, Buochs (CH); Robert Milns, Buochs (CH); Paul Gibson, Alpnachstad (CH)

(73) Assignee: Pilatus Flugzeugwerke AG, Stans (CH)

( * ) Notice: Subject to any disclaimer, the term of this patent is extended or adjusted under 35 U.S.C. 154(b) by 0 days.

(21) Appl. No.: 14/468,747

(22) Filed: Aug. 26, 2014

(65) Prior Publication Data

US 2015/0051791 A1    Feb. 19, 2015

Related U.S. Application Data

(63) Continuation of application No. 13/513,824, filed as application No. PCT/EP2010/068999 on Dec. 6, 2010, now abandoned.

(30) Foreign Application Priority Data

Dec. 4, 2009    (WO) .................. PCT/EP2009/066449

(51) Int. Cl.
*G01M 17/00* (2006.01)
*G07C 5/08* (2006.01)
(Continued)

(52) U.S. Cl.
CPC ............. *G07C 5/085* (2013.01); *B64D 43/00* (2013.01); *B64D 45/00* (2013.01); *G01C 23/00* (2013.01);
(Continued)

(58) Field of Classification Search
CPC .... G01C 23/00; G01C 23/005; G07C 5/0808; F02D 41/22; G01S 7/064; G08B 23/00
See application file for complete search history.

(56) References Cited

U.S. PATENT DOCUMENTS

| 4,258,421 A | 3/1981 | Juhasz et al. |
| 4,604,711 A | 8/1986 | Benn et al. |

(Continued)

OTHER PUBLICATIONS

International Search Report from International Application No. PCT/EP2010/068999, mailed Feb. 14, 2011.

(Continued)

*Primary Examiner* — Mary Cheung
(74) *Attorney, Agent, or Firm* — Steinberg Intellectual Property Law LLC; Gloria M. Steinberg, Esq.

(57) ABSTRACT

Digital recording and replay system for an aircraft, comprising a Mission Computer with an Operational Flight Program for generating instrument data for onboard instruments of the aircraft; a Mission Data Recorder connected to said Mission Computer for recording said instrument data; and a Mission Debriefing System; wherein the Mission Debriefing System is configured to reproduce the onboard instruments of the aircraft based on instrument data retrieved from the Mission Data Recorder. Method for reproduction of onboard instrumentation of an aircraft, comprising the steps of connecting a Mission Data Recorder to a Mission Computer of an aircraft having an Operational Flight Program for generating instrument data for onboard instruments; recording instrument data; providing a Mission Debrief System and causing it to reproduce the onboard instruments of the aircraft based on instrument data retrieved from the Mission Data Recorder.

17 Claims, 2 Drawing Sheets

(51) Int. Cl.
    *G01C 23/00* (2006.01)
    *G09B 9/08* (2006.01)
    *B64D 43/00* (2006.01)
    *B64D 45/00* (2006.01)
(52) U.S. Cl.
    CPC ........ *G09B 9/08* (2013.01); *B64D 2045/0065* (2013.01)

(56) References Cited

U.S. PATENT DOCUMENTS

| | | | |
|---|---|---|---|
| 5,467,274 A | 11/1995 | Vax | |
| 5,632,622 A | 5/1997 | Bothwell | |
| 2005/0065682 A1* | 3/2005 | Kapadia | G07C 5/008 701/36 |
| 2007/0236366 A1 | 10/2007 | Gur et al. | |
| 2009/0094011 A1* | 4/2009 | Griffin | G06Q 10/047 703/8 |

OTHER PUBLICATIONS

International Preliminary Report on Patentability for International Application No. PCT/EP2010/068999, issued Jun. 5, 2012.

\* cited by examiner

DIGITAL RECORDING AND REPLAY SYSTEM FOR AN AIRCRAFT AND METHOD FOR REPRODUCTION OF ONBOARD INSTRUMENTATION OF AN AIRCRAFT

CROSS-REFERENCE TO RELATED APPLICATIONS

This application is a continuation of U.S. patent application Ser. No. 13/513,824, filed Jun. 4, 2012, which is a U.S. National Phase Application of the similarly-titled International Application No. PCT/EP2010/068999, filed Dec. 6, 2010. This application also claims priority under 35 U.S.C. §§119(a)-(d) to International Application No. PCT/EP2009/066449, filed on Dec. 4, 2009. The disclosures of these related applications are hereby incorporated by reference in their entireties.

FIELD OF THE INVENTION

The present invention relates to a Digital recording and replay system for an aircraft and to a method for reproduction of onboard instrumentation of an aircraft.

BACKGROUND OF THE INVENTION

Quite often there is a need to be able to replay/reproduce the exact instrumentation presented to the pilots of an aircraft after a flight. Furthermore, one needs to be able to present this instrumentation in the context of the particular scenario and also to be able to reconstruct the pilot's reaction to the events occurred during the flight. In addition the reaction of an airplane in response to the pilot's actions needs to be documented.

Several systems are known which are able to record aircraft parameters and store instrumentation data as a video and/or audio recording. These systems are known as flight data recorders and cockpit voice/image recorders. They are usually placed in an aircraft for the purpose of facilitating the investigation of an aircraft accident or incident. In newer aircrafts installation of cockpit image recorders has been proposed to provide a video recording of the instruments within the cockpit. Such systems typically consist of a camera and microphone located in the cockpit to continuously record cockpit instrumentation, the outside viewing area, engine sounds, radio communications, and ambient cockpit sounds. After an accident or incident, the flight data recorders and cockpit voice/image recorders are retrieved and a video and/or audio recording made during the flight is reconstructed along with recorded flight parameters.

However, known systems suffer from the major drawback that since they record aircraft parameters and an audio and/or video feed they can't reliably reproduce the instruments exactly as shown to the pilot. This is due to the fact that the video images recorded might be blurred, the camera view might be blocked, etc. or generally of low quality. Furthermore, due to the high storage capacity requirements for a video recording covering all instruments, either the length of such a recording is limited, or some of the instruments are not covered by the video recording.

Furthermore, the reconstruction of the onboard instrumentation based on a video recording is a very time-consuming procedure prone to errors.

In an attempt to overcome these disadvantages, another kind of known system records merely aircraft parameters on the bases of which such onboard instruments are constructed. These instruments are then to be reconstructed based on the recorded parameters. However, relying merely on the set of recorded parameters does not necessarily allow a faithful reconstruction of the onboard instrumentation. One cause for this is the malfunction of the avionics systems of the aircraft.

A special field where such a reconstruction of onboard reconstruction is frequently performed is in the field of training aircrafts where the exact training environment is reconstructed for debrief and training analysis purposes. This field of application poses special requirements on such recording and replay systems, such as their ability to allow a quick and reliable reconstruction of the training environment including onboard instrumentation but also of visual and audible alerts received through different channels of onboard avionics systems. Furthermore, such systems must be able to be reused numerous times and their processing should be as straight-forward as possible.

Such training aircrafts are provided with a so-called mission computer as well with an operational flight program defining the training scenario performed by the pilot/trainee. Therefore, the recorded instrument data needs to be recorded in relation with this scenario since the onboard instruments are always in relation with the operational flight program and only make sense in this context.

The objective of the present invention is thus to provide a recording and replay system for an aircraft that is able to reliably reconstruct the onboard instruments of an aircraft, preferably a training aircraft, comprising a mission computer with an operational flight program. A further objective of the invention is to ensure that the onboard instrumentation is easy to reconstruct and can store instrument data covering a prolonged period of time.

Furthermore it is an objective of the present invention to provide a method for reproduction of onboard instrumentation of an aircraft able to reliably reconstruct the onboard instruments of an aircraft, preferably a training aircraft. Said method should allow quick reconstruction of onboard instruments of an aircraft brought in relation with an operational flight program of a mission computer of the aircraft.

SUMMARY OF THE INVENTION

The above-identified objectives of the present invention are solved by a recording and replay system for an aircraft, comprising a mission computer with an operational flight program for generating instrument data for onboard instruments of the aircraft; a mission data recorder connected to said mission computer for recording said instrument data as processed by mission computer with an operational flight program; and a mission debriefing system; wherein the mission debriefing system is configured to reproduce the onboard instruments of the aircraft based on instrument data retrieved from the mission data recorder.

The above-identified objectives of the present invention are also solved by a method for reproduction of onboard instrumentation of an aircraft, comprising the steps of connecting a mission data recorder to a mission computer of an aircraft having an operational flight program for generating instrument data for onboard instruments of the aircraft; recording instrument data as processed by mission computer with an operational flight program and sent to the onboard instruments of the aircraft using said mission data recorder; providing a mission debrief system; and causing said mission debrief system to reproduce the onboard instruments of the aircraft based on instrument data retrieved from the mission data recorder.

The objectives identified above are solved by the present invention in that instrument data for the onboard instruments of the aircraft, are recorded by the mission data recorder instead of aircraft parameters or video recording of the actual instruments. In other words the system records aircraft parameters where the signals have been processed through digital systems for accuracy and latency and relevance to the operator of the aircraft. The instruments of the aircraft can then be reconstructed based on the recorded parameters. Relying on the set of recorded parameters gives a faithful reconstruction of the activities onboard instrumentation central to the operations of the aircraft, including an accurate representation of malfunctions. One cause for this is the malfunction of the avionics systems of the aircraft which lies at the heart of the computing systems used to process the data.

The concept of debrief reconstruction uses recorded parameters of the avionics systems to reconstruct the onboard instruments as the pilot/operator would see them during flight, without the use of video systems.

This concept allows all pilot debrief to take place using the reconstructed instrumentation data, rather than basing debrief on recorded video. The additional onboard instruments available due to the recording method are an additional training aid provided for very little overhead compared to the recording the additional 20-30 video streams that would traditionally be required under such a debriefing system. The digital signal processing of incoming source signals such as barometric altitude, airspeed or body lateral acceleration is carried out to present the data to the operator, and this can be re-used by the recording system to maximize efficiency.

In view of the drawbacks of the prior art, the objective of the present invention and the inventive solution summarized above, the present invention has the main advantage that the data recorded reliably reflects the onboard instrumentation as used by the operator, as opposed to known systems recording merely aircraft parameters that are supposed to result in some expected instrumentation display, while at the same time simplifying the retrieval and minimizing the storage requirements, as compared to a recording of a video image of the instruments which is susceptible to errors in reconstruction, requires significantly more storage capacity and might not even cover all onboard instruments.

BRIEF DESCRIPTION OF THE DRAWINGS

Further characteristics and advantages of the invention will in the following be described in detail by means of the description and by making reference to the drawings. Which show.

DETAILED DESCRIPTION OF THE INVENTION

Certain terms will be used in this patent application, the formulation of which should not be interpreted to be limited by the specific term chosen, but as to relate to the general concept behind the specific term.

In the context of the present application, training functionality shall mean the functionalities of a training aircraft which relate to the training of a pilot/trainee in an emulated environment within the aircraft. The training functionalities further relate to tactical scenarios, simulated warfare, all these according to a training syllabus.

The term aircraft shall mean in the context of the present application any kind of aircraft including recreational, civil but especially training aircrafts providing tactical/training functionalities.

Hardware Architecture

Figure 1:
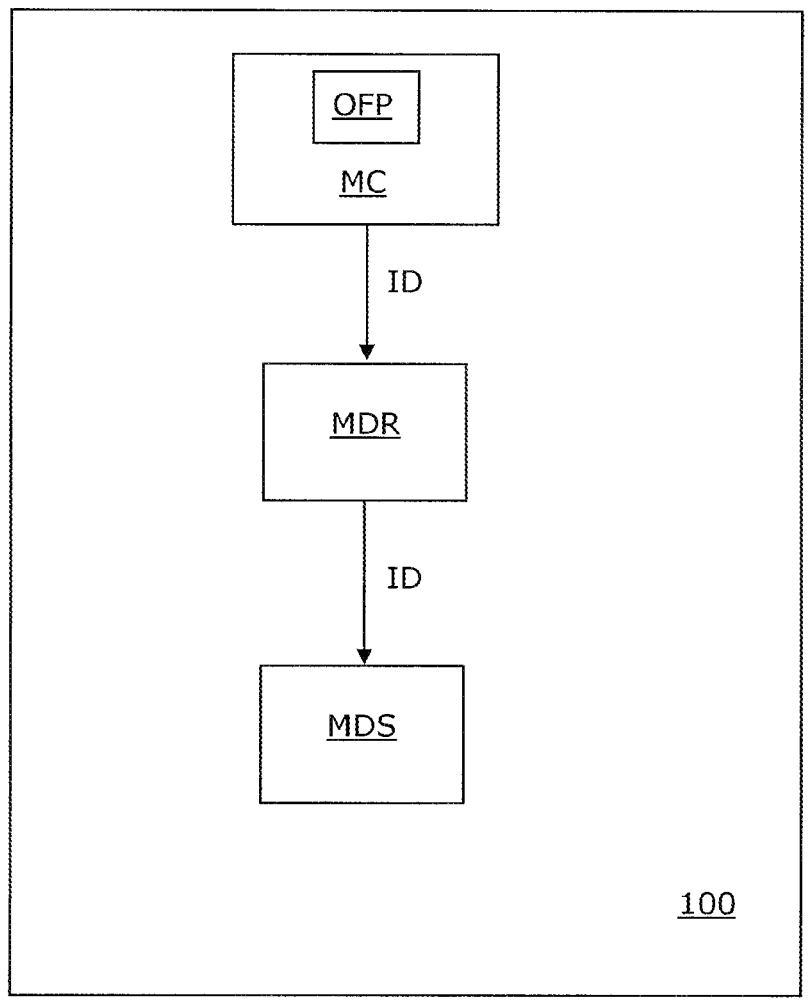
FIG. 1 is a schematic block diagram of the first embodiment of the recording and replay system according to the present invention.

FIG. 1 shows a schematic block diagram of the first embodiment of the recording and replay system according to the present invention. This figure depicts the essential concept of the invention, i.e. the interaction between the mission computer MC, the mission data recorder MDR and the mission debriefing system MDS.

The mission computer MC is a central part of the avionics system of a training aircraft and comprises the operational flight program OFP, a dataset defining the training scenario and/or mission of the aircraft, wherein the operational flight program OFP takes as input unprocessed data, applies digital signal processing techniques for presentation to the operator and generates instrument data ID for onboard instruments of the aircraft. The mission computer MC carries out digital signal processing of incoming source signals from a number of sources such as air data computers, radar altimeters and inertial reference systems that supply raw data transposed from the original analogue signal measurement. To ensure that the data is supplied to the pilot/operator in a manner that is usable, the information is sampled and filtered to show a relatively stable value whilst reflecting the current trends in the aircraft parameters. Once this processing is carried out by the operational flight program OFP within the mission computer MC, the processed instrument data ID can be presented to the operator, and this can be re-used by the mission data recorder MDR to maximize efficiency in re-presenting this data in ground based debrief systems.

The mission data recorder MDR, a data recording and recovery device is connected to the mission computer MC, is provided for recording the instrument data ID generated by the operational flight program OFP. The role of the mission data recorder MDR is to record instrument data ID to allow post flight mission analysis and debrief—to support the training of aircrew in the aircraft.

It shall be noted that the mission data recorder MDR is not a replacement or alternative for an accident or flight data recorder.

The mission debriefing system MDS is a data recovery and instrumentation reconstruction system, configured to reproduce the onboard instruments of the aircraft based on instrument data ID retrieved from the mission data recorder MDR.

Mission Computer

Figure 2A:
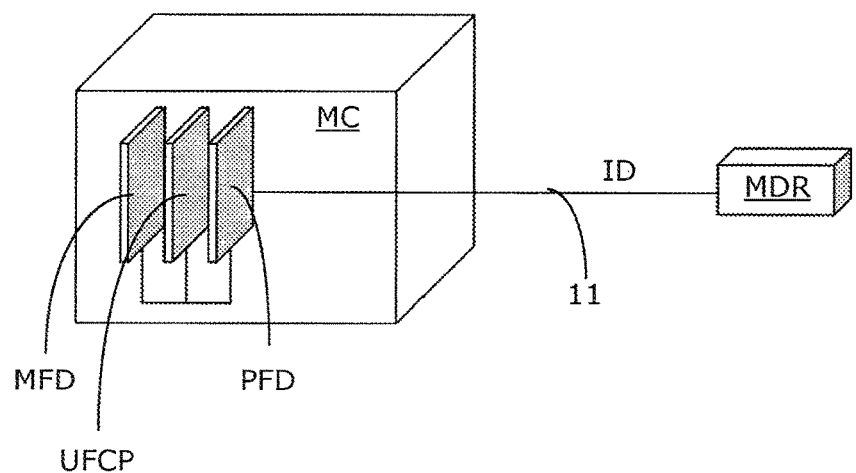
FIG. 2A is a schematic block diagram of the mission computer of an aircraft as being connected to a mission data recorder according to the present invention.

FIG. 2A shows schematic block diagram of the mission computer MC of an aircraft as being connected to a mission data recorder MDR. The connection is preferably established via a mission bus 11. In a preferred embodiment of the present invention, the mission bus 11 is used to download new operational flight program OFP files into the mission computer MC; download mission files; download digital map tiles; and to upload instrument data ID for recording by the mission data recorder MDR. The mission computer MC initiates all transfers on the mission bus 11. The mission computer MC mounts the removable memory module RMM of the mission data recorder MDR as a remote disk drive in order to download mission files and/or to retrieve digital map tiles. Means for receiving said removable memory module RMM are provided within the mission data recorder MDR, such as a memory card slot or suitable connectors.

The mission computer MC also controls the instrument data ID at the instruments output for the onboard instruments such as the Multi-Function Display MFD and Up Front Control Panel UFCP for example. The mission computer MC has a graphics card dedicated to drawing the onboard instruments such as the displays for the multi-function display MFD based on the instrument data ID.

The mission computer MC main board contains the operational flight program OFP that calculates the instrument data ID required for the onboard instruments. This instrument data ID is transferred to the graphics cards.

To reduce loading, the packets of the instrument data ID are only sent when their data content has changed. Each packet is otherwise only sent every few seconds to ensure subsequent playback synchronization is achieved rapidly during reconstruction.

The same instrument data ID can also be transferred to the mission data recorder MDR due to the underlying similarity in the data structure. Therefore at the same time as sending the instrument data ID to the graphics cards, the instrument data ID is sent to the mission data recorder MDR preferably as UDP packets over the Ethernet link.

A header is added to the mission data recorder MDR output that defines the instrument data ID contained within a packet. A small number of additional packets are included on the mission data recorder MDR output that use the same data architecture/structure but are not sent to the graphics cards. These are included to aid reconstruction of other systems other than the aircraft multi-function display MFD (e.g. Up-Front Control Panel UFCP or Primary Flight Display PFD).

Mission Data Recorder

Figure 2B:
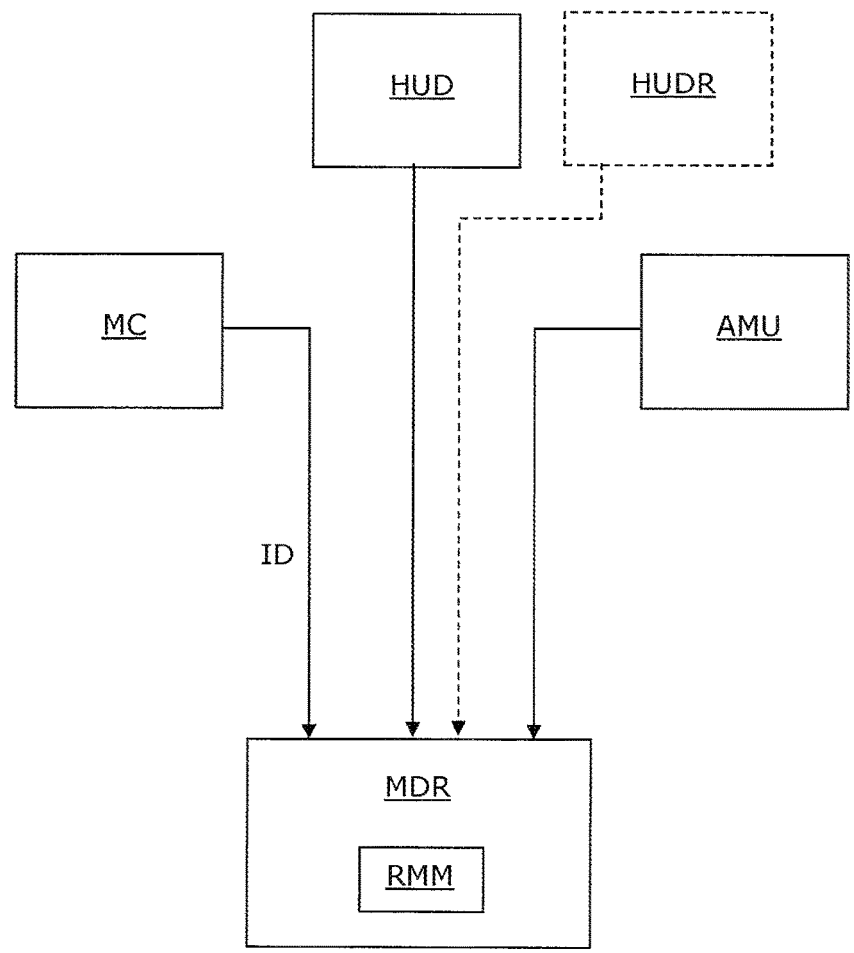
FIG. 2B is a schematic block diagram depicting the integration of the mission data recorder of the present invention with the avionics system of an aircraft.

FIG. 2B shows a schematic block diagram depicting the integration of the mission data recorder MDR of the present invention with the avionics system of an aircraft.

The role of the mission data recorder MDR is to record instrument data ID to allow post flight mission analysis and debrief—to support the training of aircrew in the aircraft. In a preferred embodiment of the present invention, the mission data recorder MDR uses Ethernet input, video and audio inputs. The Ethernet input is from the mission computer MC, and carries the data used to generate the onboard instruments such as the multi-function display M FD displays. The video shows head-up display HUD symbology overlaid on a forward view of the outside world.

The mission data recorder MDR is further connected to the audio management unit AMU which controls all audio signals within the aircraft.

In a two-cockpit training aircraft, the head-up display HUD is installed in the front cockpit position, and incorporates a forward-looking camera. This camera produces a video image of the view ahead of the aircraft for display on the rear seat head-up display repeater HUDR. The head-up display HUD symbology is superimposed over the image of the outside world on the head-up display repeater HUDR. In this case, the video is of the video seen on a head-up display repeater HUDR, and shows head-up display HUD symbology overlaid on a forward view of the outside world. In this two-cockpit training aircraft, the audio is of the front cockpit headset audio so that all radio and intercom traffic and alert tones are available.

Additional event data, generated by the pilot via additional controls of the aircraft such as a console mounted event button or a stick mounted trigger and pickle buttons, are also recorded by the mission data recorder MDR.

In a preferred embodiment, the mission computer MC transmits, via UDP broadcast on the Ethernet ports 6003 (display data and instrumentation) and 6005 (Radar picture). This is the instrument data ID that is used for the generation of the onboard instruments such as multi-function display MFD display graphics. Some additional data that is available in the mission computer MC and used on further onboard instruments such as the primary flight display PFD is also transmitted on the Ethernet bus.

The mission data recorder MDR receives this UDP data, and records it. The mission data recorder MDR does not make any attempt to decode the UDP port 6003/6005 broadcast data. The resultant UDP contents are preferably stored on a removable memory module RMM.

In a preferred implementation, the instrument data ID is stored on the removable memory module RMM in files that are nominally 30 MB in size—this equates to approximately 5 to 6 minutes of recording time. Individual file sizes are limited so that if a file should become corrupted then only 5 to 6 minutes of data are lost.

Time stamp information is embedded within the recording, such that at replay/reconstruction the actual time of the recording can be determined, for cross-relation to other external events and also to allow synchronized replay with the video and events data (and recordings from other aircraft).

Preferably, the video and audio data are combined into a single recording stream. The audio is added to the video (left and right channels) to become a standard video with stereo audio channels. The audio/video is compressed for example using MPEG-2 compression, at 720 by 480 pixels image size and 60 frames per second. The resultant M PEG digital data is stored on the removable memory module RMM. The data is recorded in files that are 30 seconds in length—these are approximately 30 MB is size. The individual file sizes are limited so that if a file should become corrupted then only 30 seconds of video are lost.

Time stamp information is embedded within the recording, such that at replay the actual time of the recording can be determined, for cross-relation to other external events and also to allow synchronized replay with the head-down Ethernet recorded data and events data (and recordings from other aircraft).

When the aircrew actuates an additional control of the aircraft such as pressing the event button, trigger or pickle button in either the front or rear cockpits of a two-cockpit training aircraft, the mission computer MC detects this. The mission computer MC then passes a UDP packet to the mission data recorder MDR with the event source code. The mission data recorder MDR records the time and event type.

In the replay/reconstruction, the event types and times can be listed. The time the event was made can be jumped to (offset by a defined amount, e.g., 5 seconds before the event was made) and the replay (video and/or head-down) played from that point.

The removable memory module RMM operates as a conventional storage, with files stored within folders. Usually the removable memory module RMM is removed/replaced for each flight.

In a preferred implementation there are 6 folders on the removable memory module RMM:

Channel 1

Within Channel 1 are sub-folders that are created at the start of each recording session (power-up). These sub-folders then hold the video recording files for that recording session.

ENet

Within ENet are the Ethernet head-down recording files and log files for all the recording sessions.

Events

Within Events is a file for each recording session. Each file contains any event data recorded for that session.

Logs

Within Logs is a file for each recording session; each file contains log information for the video recording of that session.

Mission

The Mission folder is relevant to data upload.

MAP (may be renamed according to the ground planning and mission computer MC configurations).

The MAP folder is relevant to data upload.

Mission Debriefing System

The mission debriefing system MDS is designed to facilitate training by assisting the instructor to reinforce key learning points from the training sortie. It also provides a reliable indication of student performance on solo sorties.

In the preferred implementation, the mission debriefing system MDS reads the Channel 1, ENet and Events folder of the removable memory module RMM to retrieve information as described above.

Means for receiving said removable memory module RMM are provided within the mission debriefing system MDS, such as a memory card slot or suitable connectors.

The video information is replayed to give a combined head-up display HUD/outside world picture. This information cannot be stored solely in instrument data ID due to the inclusion of the outside world picture that cannot faithfully be reproduced.

The mission debriefing system MDS displays/regenerates for example the following onboard instruments based on instrument data ID:

Up-Front Control Panel (UFCP);
Left Multi-Function Display (LMFD);
Primary Flight Display (PFD); and
Right Multi-Function Display (RMFD).

Mission debriefing system MDS regenerates onboard instruments of the aircraft as per the instrument data ID recorded on the removable memory module RMM during the mission. The mission debriefing system MDS allows the user to regenerate any recorded multi-function display MFD page even if it was not actually selected for display during the mission (i.e. selected by the pilot during flight) as all instrumentation is recorded regardless of display selected.

These additional displays are available at very little overhead compared to recording the additional 20-30 video streams that would traditionally be required under such a debriefing system.

The Events information is used to highlight within the replay reconstruction where certain events occurred. Events of interest to a debrief scenario may then be used to quickly navigate through the mission.

In a further embodiment of the present invention, the mission debriefing system MDS is connectable to said mission data recorder MDR for retrieving said recorded instrument data II) and subsequently reproduce the onboard instruments of the aircraft based on instrument data ID retrieved from the mission data recorder MDR, said reproduction being performed within the aircraft using the onboard instruments of the aircraft. This has the advantage that since the reconstruction is performed within the aircraft, the environment thus reconstructed will be a true reconstruction of the environment during flight.

In an even further embodiment of the present invention, the mission debriefing system MDS is connectable to a mission data recorder MDR for retrieving said recorded instrument data ID and subsequently reproduce the onboard instruments of the aircraft based on instrument data ID retrieved from the mission data recorder MDR, said reproduction being performed within a simulator comprising a mission computer MC corresponding to said simulator replicating the onboard instruments of the aircraft. This has the advantage that since the reconstruction is performed within a simulator replicating the aircraft, the environment thus reconstructed will be a true reconstruction of the environment during flight without occupying an aircraft.

It will be understood that many variations could be adopted based on the specific structure hereinbefore described without departing from the scope of the invention as defined in the following claims.

What is claimed is:

1. A digital recording and replay system for an aircraft, comprising:
    a Mission Computer that is a central part of an avionics system of the aircraft;
    an Operational Flight Program stored on the Mission Computer, the Operational Flight Program comprising a dataset defining at least one of a training scenario and a mission of the aircraft, the Operational Flight Program being configured to apply digital signal processing to input source signals representing aircraft parameters and to generate therefrom instrument data for onboard instrument of the aircraft to be presented to an operator or pilot of the aircraft, said instrument data comprising input data transferred to a graphics card of the aircraft and driving a display of the aircraft;
    a Mission Data Recorder operatively connected to said Mission Computer configured to record said instrument data; and
    a Mission Debriefing System configured to reproduce the onboard instruments by regenerating the display of the aircraft based on said instrument data retrieved from the Mission Data Recorder, wherein the display can be selected or unselected during the training scenario or the mission.

2. A digital recording and replay system for an aircraft according to claim 1, the Mission Data Recorder comprising a first means for receiving a Removable Memory Module configured to store said instrument data.

3. A digital recording and replay system for an aircraft according to claim 2, the Mission Debriefing System comprising a second means for receiving a Removable Memory Module configured to store said instrument data.

4. A digital recording and display system for an aircraft according to claim 3, further comprising a Removable Memory Module configured to store said instrument data, removable from said first means, and insertable into the second means.

5. A digital recording and replay system for an aircraft according to claim 1, wherein the Mission Debriefing System is operatively connectable to said Mission Data Recorder and configured to retrieve said recorded instrument data and subsequently reproduce the onboard instruments of the aircraft within the aircraft using onboard instruments of the aircraft based on instrument data retrieved from the Mission Data Recorder.

6. A digital recording and replay system for an aircraft according to claim 1, wherein said instrument data comprises parameters of an avionics system of the aircraft and wherein said reproduction by the Mission Debriefing System comprises a reconstruction of a display as a pilot would see the display during a flight of the aircraft during which said instrument data has been recorded.

7. A digital recording and replay system for an aircraft according to claim 1, wherein the Mission Computer is configured to send said input data as packets to the Mission Data Recorder.

8. A digital recording and replay system for an aircraft according to claim 7, wherein the Mission Computer is configured to include in said packets a header defining the data contained within said packets.

9. A digital recording and replay system for an aircraft according to claim 7, wherein the Mission Computer is configured to send additional packets to the Mission Data Recorder comprising data of additional aircraft avionics system other than said display.

10. A digital recording and replay system for an aircraft according to claim 1, wherein said instrument data comprises event data generated in response to pilot actions.

11. A digital recording and replay system for an aircraft according to claim 10, wherein said event data is generated from onboard controls of the aircraft.

12. A digital recording and display system for an aircraft according to claim 1, wherein the Operational Flight Program is configured to apply digital signal processing to the input source signals before the Mission Data Recorder records said instrument data.

13. A method of reproducing onboard instrumentation of an aircraft, comprising the steps of:
    operatively connecting a Mission Data Recorder to a Mission Computer of an avionics system of the aircraft having an Operational Flight Program;
    applying digital processing to input source signals representing aircraft parameters, said digital signal processing being performed by the Operational Flight Program;
    generating instrument data for onboard instruments of the aircraft to be presented to an operator or pilot of the aircraft, said instrument data comprising input data transferred to a graphics card of the aircraft and driving a display of the aircraft, wherein said generating is performed by the Operational Flight Program;
    recording said instrument data generated by the Mission Computer using said Mission Data Recorder; and
    reproducing the onboard instruments by regenerating the display of the aircraft with a Mission Debrief System based on instrument data retrieved from the Mission Data Recorder, wherein the display can be selected or unselected during the training scenario or the mission.

14. A method of reproducing onboard instrumentation of an aircraft according to claim 13, wherein the Mission Data Recorder comprises a first means for receiving a Removable Memory Module configured to store said instrument data, and further comprising the steps of inserting a Removable Memory Module configured to store said instrument data into said first means, and storing said instrument data in the Removable Memory Module.

15. A method of reproducing onboard instrumentation of an aircraft according to claim 14, wherein the Mission Debriefing System comprises a second means for receiving said Removable Memory Module, and further comprising the steps of:
    removing the Removable Memory Module from said first means; and
    inserting the Removable Memory Module into the second means.

16. A method of reproducing onboard instrumentation of an aircraft according to claim 13, wherein the reproducing step includes the steps of:
    operatively connecting the Mission Debriefing System to the Mission Data Recorder;
    retrieving said recorded instrument data; and
    reproducing the onboard instruments of the aircraft within the aircraft using onboard instruments of the aircraft.

17. A method of reproducing onboard instrumentation of an aircraft according to claim 13, wherein said digital signal processing step is performed before said generating step.

* * * * *